US007422092B2

(12) United States Patent
Hitchcock et al.

(10) Patent No.: US 7,422,092 B2
(45) Date of Patent: Sep. 9, 2008

(54) CONTROLLABLE COMPRESSIBLE FLUID DAMPER (76) Inventors: Gregory Hitchcock, 839 N. Center St., Reno, NV (US) 89501; Faramarz Gordaninejad, 4551 Lynnfield Way, Reno, NV (US) 89509

( * ) Notice: Subject to any disclaimer, the term of this patent is extended or adjusted under 35 U.S.C. 154(b) by 0 days.

(21) Appl. No.: 10/887,408

(22) Filed: Jul. 7, 2004

(65) Prior Publication Data
US 2005/0150731 A1  Jul. 14, 2005

Related U.S. Application Data (60) Provisional application No. 60/485,056, filed on Jul. 7, 2003.

(51) Int. Cl.
F16F 9/34 (2006.01)
F16D 57/00 (2006.01)

(52) U.S. Cl. ............. 188/267.2; 188/267.1; 267/140.15

(58) Field of Classification Search ................ 188/266, 188/267.1, 267.2, 161–163; 267/140.14, 267/140.15
See application file for complete search history.

(56) References Cited

U.S. PATENT DOCUMENTS

| 3,362,508 | A |   | 1/1968  | Mayer |
|---|---|---|---|---|
| 3,672,474 | A |   | 6/1972  | Mayer et al. |
| 4,679,775 | A | * | 7/1987  | Funaki et al. ............ 267/64.27 |
| 5,158,109 | A |   | 10/1992 | Hare, Sr. |
| 5,158,269 | A | * | 10/1992 | Hein et al. ................... 267/220 |
| 5,277,281 | A |   | 1/1994  | Carlson et al. |
| 5,277,283 | A |   | 1/1994  | Yamaoka et al. |
| 5,284,330 | A |   | 2/1994  | Carlson et al. |
| 5,316,114 | A |   | 5/1994  | Furuya et al. |
| 5,316,272 | A |   | 5/1994  | Davis |
| 5,398,917 | A |   | 3/1995  | Carlson et al. |
| 5,584,367 | A | * | 12/1996 | Berdut ........................ 188/267 |
| 5,680,913 | A | * | 10/1997 | Wood ........................... 188/285 |
| 5,878,997 | A | * | 3/1999  | Miesner ................. 267/140.14 |
| 6,019,201 | A | * | 2/2000  | Gordaninejad et al. ... 188/267.1 |
| 6,086,060 | A | * | 7/2000  | Berthold ................... 267/64.15 |
| 6,131,709 | A | * | 10/2000 | Jolly et al. ............... 188/267.2 |
| 6,151,930 | A |   | 11/2000 | Carlson |
| 6,279,702 | B1 | * | 8/2001 | Koh ......................... 188/267.2 |
| 6,340,153 | B1 | * | 1/2002 | Miesner ................. 267/140.11 |
| 6,427,813 | B1 | * | 8/2002 | Carlson ................... 188/267.2 |
| 6,471,018 | B1 | * | 10/2002 | Gordaninejad et al. ... 188/267.1 |

(Continued)

FOREIGN PATENT DOCUMENTS

DE          3306180      *   8/1984

(Continued)

*Primary Examiner*—Melody M Burch
(74) *Attorney, Agent, or Firm*—Klarquist Sparkman, LLP (57) ABSTRACT A damper/strut that can provide variable damping and spring energy storage and dissipation. One embodiment includes an adjustable magnetorheological damper and a mechanically adjustable fluid spring in association with an internal accumulator. A combination of internal and external electromagnets generate the magnetic fields required to activate internally maintained magnetorheological material so that its apparent viscosity undergoes the desired change for a given disturbance. By controlling the strength of the magnetic fields generated in the device, the damping capacity and energy storage of the compressible liquid spring can be affected to provide a semi-active damper that can both dissipate and store energy. The proposed devices can be coupled with a sensor feedback and a control system to provide fast and accurate response force for a variety of engineering applications.

9 Claims, 5 Drawing Sheets

U.S. PATENT DOCUMENTS

| | | |
|---|---|---|
| 6,497,309 B1 | 12/2002 | Lisenker |
| 6,510,929 B1 * | 1/2003 | Gordaninejad et al. ... 188/267.2 |
| 6,581,740 B2 | 6/2003 | Szalony |
| 6,681,905 B2 * | 1/2004 | Edmondson et al. ..... 188/267.2 |
| 2002/0092721 A1 * | 7/2002 | Oliver et al. ............. 188/267.2 |
| 2003/0159897 A1 * | 8/2003 | Oliver et al. ........... 188/322.19 |
| 2004/0195062 A1 * | 10/2004 | Anderfaas et al. ........ 188/267.2 |
| 2004/0256185 A1 * | 12/2004 | Barbison et al. ......... 188/267.2 |
| 2005/0011710 A1 * | 1/2005 | Hitchcock et al. ........ 188/267.2 |
| 2005/0072638 A1 * | 4/2005 | Kim ........................ 188/267.2 |

FOREIGN PATENT DOCUMENTS

| | | | |
|---|---|---|---|
| JP | 61-211545 | * | 9/1986 |
| JP | 63231031 A | * | 9/1988 |
| WO | WO 99/27273 | | 6/1999 |

\* cited by examiner

CONTROLLABLE COMPRESSIBLE FLUID DAMPER

CROSS REFERENCE TO RELATED APPLICATION

The present application claims priority through, and hereby incorporates by reference in its entirety, the applicants' prior provisional application, filed Jul. 7, 2003, entitled "CONTROLLABLE COMPRESSIBLE MAGNETORHEOLOGICAL FLUID DAMPER," Ser. No. 60/485,056.

FIELD OF INVENTION

The present invention relates to an adjustable controllable compressible fluid damper. More particularly, one embodiment provides one or more mechanisms for controlling both the damping and the liquid spring storage force characteristics of the damper.

BACKGROUND

Magnetorheological fluid (MRF) damper/strut force characteristics have been controlled by varying electrical current to an electromagnet(s), which affect the magnetorheological (MR) fluid's apparent viscosity. Increasing the magnetic field can lead to increased apparent and effective viscosity of an MRF. These types of controllable damping devices can change its force response in milliseconds through the magnetic field dependent material properties of an MRF.

Magnetorheological fluids often consist of micron-size ferrous particles suspended in a carrier fluid such as 1-10 micron sized spherical carbonyl iron particles suspended in silicone oil. The material's rheological change occurs when a magnetic field causes the ferrous particles to polarize and attract, thus, increasing the apparent viscosity of the MRF. As the magnetic field strength increases, the dipole moment created within the suspended ferrous particles increases, thus increasing the attraction between the suspended particles. As stronger attraction forces are created with increasing external magnetic field strength, the suspended particles form structured columns that increases the apparent viscosity of the MRF, resulting in higher resistance to fluid flow and decreased fluid compressibility.

Background references include: U.S. Pat. No. 5,277,281 to Carlson et al, entitled Magnetorheological Fluid Dampers; U.S. Patent No. 5,316,272, to Davis, entitled Liquid Spring Vehicular Suspension System and Associated Control Apparatus; U.S. Pat. No. 6,131,709, to Jolly et al, entitled Adjustable Valve and Vibration Damper Utilizing Same; U.S. Pat. No. 6,151,930, to Carlson, entitled Washing Machine Having a Controllable Field Response Damper; U.S. Pat. No. 6,497,309, to Lisenker, entitled Magnetorheological Damper With An External Coil; U.S. Pat. No. 6,510,929, to Gordaninejad, entitled Controllable Magnetorheological Fluid Damper; U.S. Pat. No. 6,547,044, to Lisenker, entitled Magnetorheological Damper With Ferromagnetic Housing Insert; and Published International Application No. WO 99/27273, by Jolly et al, entitled Adjustable Valve and Vibration Dampers.

BRIEF SUMMARY OF ASPECTS OF THE INVENTION

In one aspect, the present invention can provide a controllable damper with adjustable damping and storage force capabilities. One embodiment provides a controllable compressible damper/strut device in which the device's damping and storage force characteristics are controlled by means of a magnetic field interaction with compressible magneto-rheological fluid contained within the device.

One preferred damper may include internal and external electromagnets or permanent magnets. In one such embodiment, the damper may include a plurality of external, modular electro- or other magnets located at various positions along the damper's axial length in order to vary the damping characteristics of MR material, such as MRF, in the damper depending on the location of the external electromagnets. Other embodiments may include a plurality of external electro- or other magnets at various locations along the damper's axial length in order to alter the compressibility of the MR material activated by such electromagnets.

In another embodiment, the damper has a primary constant volume MRF chamber in which at least one internal magnet or electromagnet and one or more external electromagnets interact to vary MR material's apparent viscosity. The primary constant volume MRF chamber may also include two variable fluid volume sub-chambers, between which an external electromagnet or internal magnet or electromagnet may generate a magnetic flux through a flow regulation orifice in a damper piston to restrict MRF transfer between the two sub-fluid volume chambers.

In yet another embodiment, the damper has a variable volume primary chamber in which at least one internal magnet or electromagnet and one or more external electromagnets interact to vary the apparent viscosity of MR material in the variable volume primary chamber. The variable volume primary chamber may also include two variable volume sub-chambers, between which an external electromagnet or internal magnet or electromagnet may generate a magnetic flux through a flow regulation orifice in a damper piston to restrict MR material transfer between the two variable volume sub-chambers. The variable volume primary chamber may include a further external or internal magnet or electromagnet to generate a further magnetic flux through a flow regulation orifice in a damper piston to restrict MR material transfer from the variable volume fluid chamber to yet another chamber.

In this regard, by-pass valving in the damper piston and one or more shim stack washers may also be included to alter the compression and rebound force of the damper if so desired. For example, these types of valving and washers, either by themselves or along with adjustment of damping characteristics of MR material such as MRF, can provide non-symmetric compression and rebound forces.

In one embodiment, the MRF valving between the two secondary fluid volume chambers may affect the controllable spring storage of the compressible fluid chamber, preferably by at least resisting fluid expansion during positive piston displacement.

In still further embodiments, the damper may include an internal spring driven accumulator, and the spring in the accumulator may be preset or adjusted to desired operating limits. The spring driven accumulator may be located within a separate secondary, tertiary, or other chamber, preferably intermediate a piston and the primary fluid chamber. This separate chamber may include compressible gas, MRF, or fluid containing compressible elastomer particles.

In the latter embodiment, the primary and separate chambers do not exchange MR material and act independently to a significant degree. Most preferably, the primary, constant volume chamber contains MR material, such as MRF, and the separate variable volume liquid spring chamber contains a compressible fluid such as silicone oil.

Alternatively, the spring driven accumulator may be located in the separate chamber in fluid communication with the primary fluid chamber, preferably also with a magnet or electromagnet capable of generating magnetic flux through a flow regulation passage to restrict MR material transfer between the primary and separate MR material chambers.

Preferably, the damper can act as a passive damping and energy storage device, while being capable of generating significant damping and energy storage capability in the event of a power system failure.

Particularly preferred embodiments may provide one or more of the following features or advantages in a semi-active or controllable compressible damper:

1. simultaneous action of (a) a controllable damper via MRF activation through an applied magnetic field and (b) spring storage through fluid compression, which might also be varied with an applied magnetic field;

2. modular and re-locatable external electromagnets which can enhance or modify damper performance by specifically increasing the magnetic field strength at differing physical locations along the damper or along varying lengths of the MRF chamber(s) in the damper;

3. an externally adjustable flow regulation passage between the damper chamber and a variable volume compressible spring chamber, preferably containing compressible fluid, fluid containing compressible particles, or gas, allowing for controlled compression;

4. separate, generally uncoupled damper and spring chambers operating without fluid transfer or the need for fluid transfer structure between the two chambers, preferably with MRF in the damper chamber and compressible gas, fluid, or fluid containing compressible components or particles, in the separate spring chamber;

5. an adjustable internal accumulator, preferably being mechanical and disposed within a shaft exposed to a liquid spring chamber, thereby allowing spring chamber response to be adjusted such as for safety or performance reasons;

6. by-pass valving and shim stack washers, such as to (a) enhance non-symmetric rebound and compression damping forces, and (b) if desired, enhance handling of high rate shock events;

7. a passive (or fail-safe) damping and energy storage capability even in the absence of a desired magnetic field or other viscosity adjusting mechanism.

In another aspect, embodiments can be designed to work independently to damp within a mechanical system or be used in conjunction with similar or other damping or energy storage devices in a system. In addition, an external control system can regulate magnetic field activation to the MRF device for specific performance requirements.

The presented device has vibration isolation and shock mitigation applications in a wide realm of applications, including automotive, aerospace, sensitive equipment, manufacturing automation systems, and civil infrastructure.

There are additional features and advantages of the present invention or varying embodiments of the present invention. They will become as this specification proceeds.

In this regard, it is to be understood that this is a brief summary of varying aspects of the present invention or various embodiments or alternative embodiments of the present invention. The present invention therefore need not provide all features noted above nor solve all problems or address all issues in the prior art noted above or otherwise following from the prior art references cited above.

BRIEF DESCRIPTION OF THE DRAWINGS

The preferred embodiments are shown in the accompanying drawings in which.

DETAILED DESCRIPTION OF THE PREFERRED EMBODIMENTS

In the following discussion, various spatially orienting terms are used. It is to be understood that these types of terms are used solely for convenience of description with respect to the accompanying drawings. These types of terms do not in and of themselves mandate any absolute orientation in space.

Figures 1, 2:
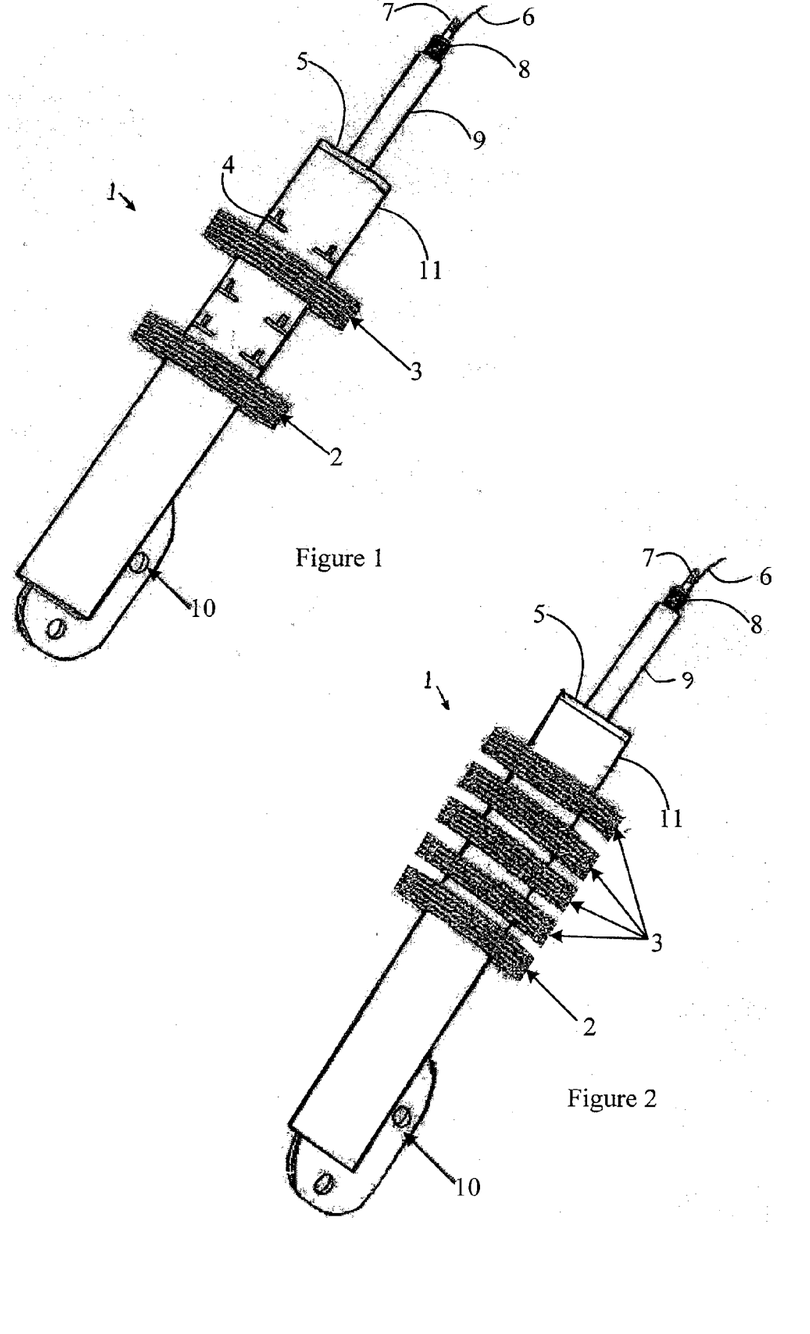
FIG. 1 is an isometric view of a controllable compressible MRF damper having two external electromagnets.
FIG. 2 is an isometric view of an alternative controllable compressible MRF damper having five external electromagnets.

With reference now to FIG. 1, a compressible MRF damper/strut 1 has two external electromagnets 2, 3. The bottom electromagnet 2 can activate, and thereby adjust the flow of, MRF through one or more lower regulation orifices or passages (not shown in FIG. 1) between a primary incompressible damper chamber 16 and a tertiary or other preferably liquid spring chamber 17.

Electromagnet 3 can be located at any cylinder-attach point 4 on the external periphery of the cylinder 11. The electromagnet 3 can activate, and thereby adjust the flow of, MRF through one or more adjacent upper regulation orifices or passages (not shown in FIG. 1) between a first secondary or sub-chamber 54 and a second secondary or sub-chamber 55 within the primary MRF chamber 16 in the MRF damper strut 1.

A cylinder end cap 5 provides relative sealing between the piston rod 9 and associated cylinder 11. Damper 1 mounting locations are defined at the base bracket 10 and the threaded portion of the piston rod 8. An internal accumulator set screw 7 passes through a central, axially extending piston rod 9. Internal electromagnet electrical supply wires 6 pass through a mating interior wire passage (not shown in FIG. 1) in the piston rod 9. External electromagnet supply wires (not shown in FIG. 1) are included in a fashion known to those skilled in the art.

With reference to FIG. 2, an alternative compressible MRF damper/strut 1 has yet additional, and in the depicted embodiment five, external electromagnets 2, 3 disposed along the axial length of the external periphery of damper 1. The bottom electromagnet 2 can activate or adjust the flow of MRF though yet another regulation orifice disposed between the damper and liquid spring chambers (not shown in FIG. 2) and four other electromagnets 3 located at, on the depicted cylinder 11, all available attach points along the cylinder 11 for maximum performance and adjustable damping control. In this latter embodiment, the viscosity and compressibility of the MRF may be adjusted along the entire axial length of a primary MRF chamber (not shown in FIG. 2) within the cylinder 11.

The cylinder 11 is preferably made of low carbon steel and has a wall thickness of suitable for the operating pressures of the damper/strut 1. The MRF contained in the damper/strut 1 may consist of carbonyl iron particles suspended in oil. The electromagnets, e.g., 2, are preferably low voltage electromagnets and generate flux sufficient to saturate adjacent MRF within the cylinder at approximately 0.8 Tesla. The number and location of the external electromagnets 2, 3 can vary depending on the damping requirements.

In this regard, each electromagnet, e.g., 2, provides a discrete (localized) increase in magnetic field potential when activated. As a result, position sensitive damper response can be electronically controlled and varied by these disparate external electromagnets.

For example, when a damper/strut 1 moves toward bottoming or topping out when its internal piston(s) (not shown in FIG. 2) approaches the mechanical limit of compression or rebound, respectively, external electromagnets located at the extremes of the piston travel can be activated to provide stiffer reaction forces, preventing structural damage to the damper that might otherwise occur by over-travel in such situations. Additionally, rebound and compression forces can be modified by the interaction of the internal electromagnet located in the piston 19 and the external electro-magnet(s) 2,3 located at predetermined locations on the cylinder so that the damper force can be precisely controlled for desired response.

The cylinder end cap 5 provides relatively sealing between the piston rod 9 and the associated cylinder 11. Damper mounting locations are defined at the base bracket 10 and the threaded end portion of the piston rod 8. An internal accumulator set screw 7 passes through a set screw passage (not shown in FIG. 2) penetrating the axial length of the piston rod 9. Internal electromagnet electrical supply wires 6 also pass through a wire passage (not shown in FIG. 2) penetrating an axial length of the piston rod 9.

Figure 3:
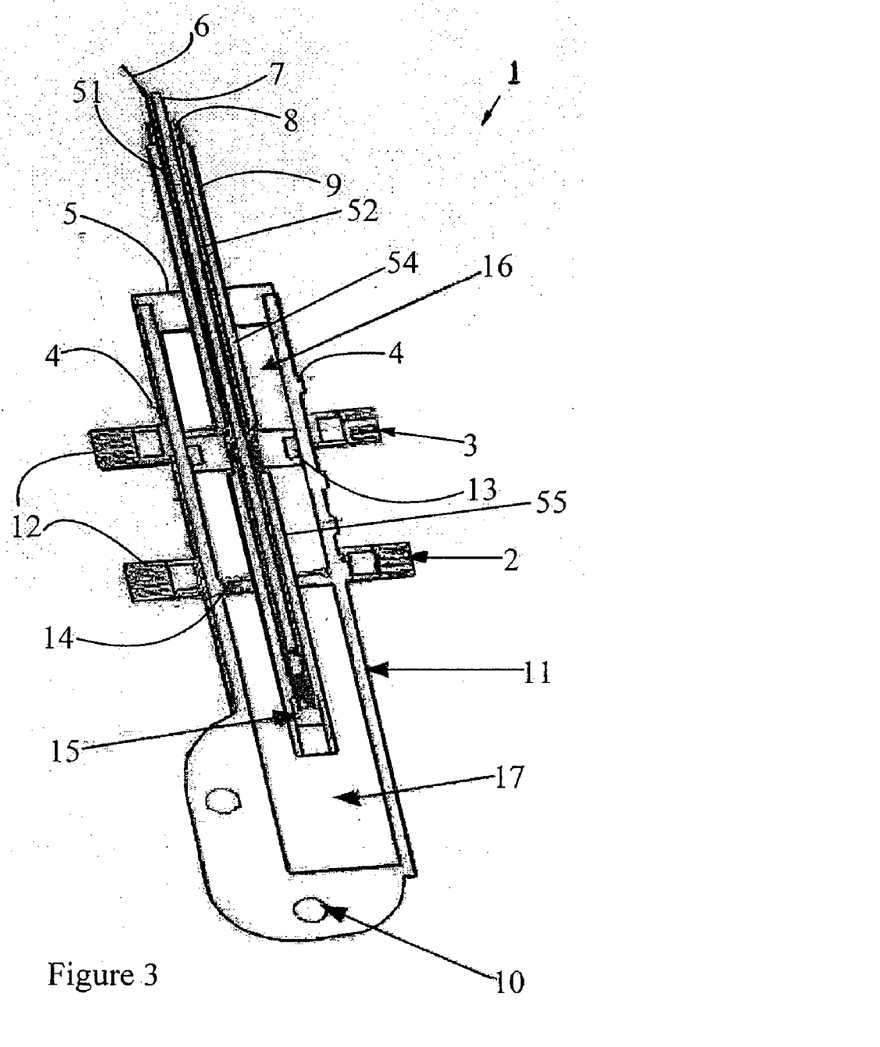
FIG. 3 is an isometric cutaway section view of the controllable compressible MRF damper of FIG. 1.

With reference now to FIG. 3, in the compressible MRF damper/strut 1 having two external electromagnets 2 and 3, the external electromagnets 2 and 3 are encased in a finned assembly 12 to accelerate convective cooling. The bottom electromagnet 2 activates, or regulates the flow of, MRF through the flow regulation orifice 14 between the damper or primary chamber 16 and the liquid spring or tertiary chamber 17. Electromagnets 3 can be located at any available attach point along cylinder 11 depending on the damping performance desired.

The cylinder end cap 5 provides relative sealing between the piston rod 9 and cylinder 11. Damper mounting locations are defined at the base bracket 10 and the threaded end portion of the piston rod 8.

An internal accumulator set screw 7 passes through a set screw passage 52 penetrating the axial length of the piston rod 9 to attached to the internal accumulator assembly 15. Internal electromagnet electrical supply wires 6 also pass through a wire passage 51 penetrating an axial length of the piston rod 9. These supply wires 6 connect to an internal piston electromagnet 13.

Figure 4:
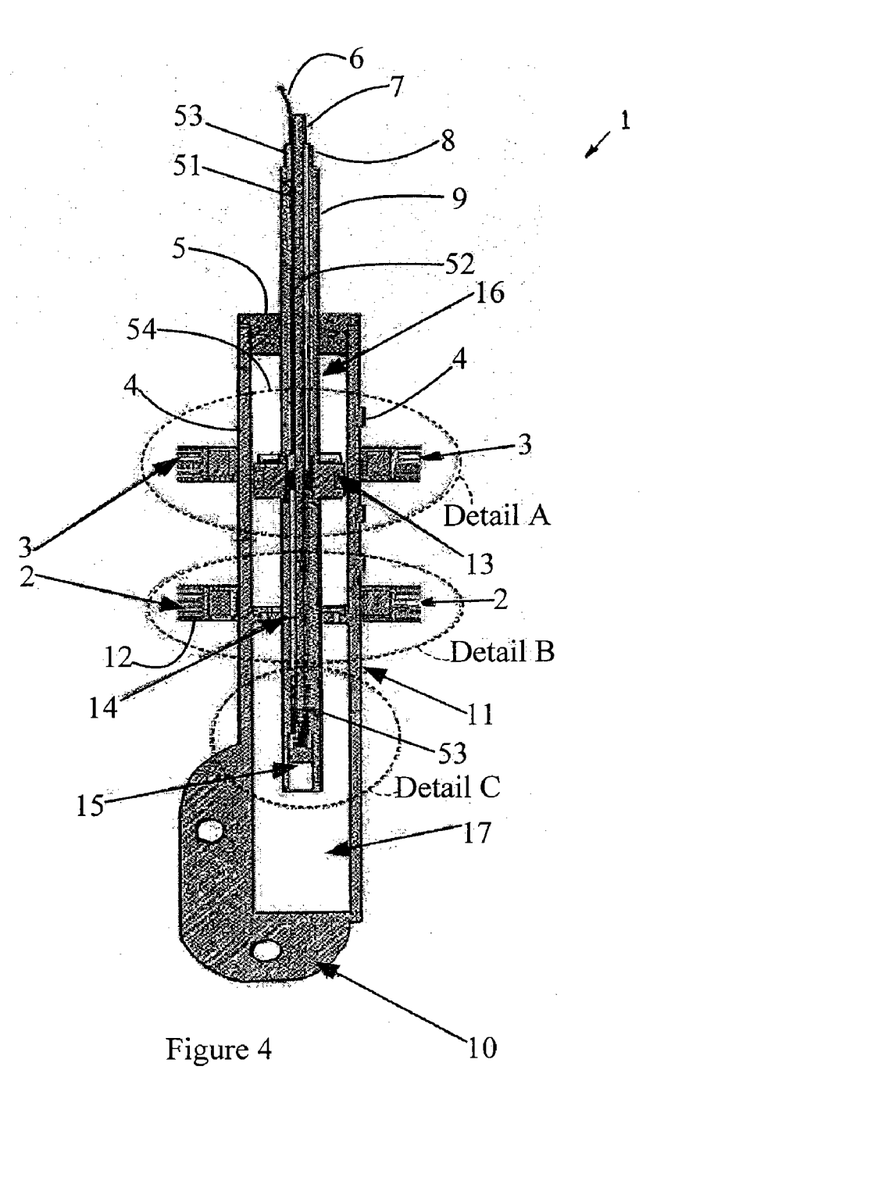
FIG. 4 is a cross section view of the controllable compressible MRF damper of FIG. 1 having sections A, B, and C.

With reference to FIG. 4, in the compressible MRF damper/strut 1 having two external electromagnets 2, 3, the external electromagnets 2, 3 are encased in a finned assembly 12 to accelerate convective cooling. The bottom electromagnet 2 activates, and regulates MRF flow through, a second flow regulation orifice 14 between the primary or damper chamber 16 and tertiary or liquid spring chamber 17. Preferably, the second regulation flow orifice 14 is fixed in its location within a corresponding lower end 58 of the damper chamber 16 along the interior periphery of the cylinder 11; but this second flow orifice 14 and corresponding lower end 58 may be made moveable or slidable (e.g., as a further piston) with respect to the cylinder 11 interior periphery or, if desired, with respect to the piston rod 9 as well.

Additional electromagnets, e.g., 3, can be located at any available attach point along cylinder 11 for desired damping performance. In the event that the additional electromagnets are located along the entire or at least additional axial length of the primary or damper chamber 16, these electromagnets may activate MRF in the damper chamber 16 to also render the MRF less compressible along the entire axial length of the damper chamber 16 thus activated by the additional magnets. This can provide even further flexibility and adjustability of the damping and energy storage characteristics of the damper/strut 1, particularly in the embodiment in which the second flow orifice 14 and corresponding lower end 58 are slidable with respect to the cylinder 11 interior periphery as discussed above.

The cylinder end cap 5 provides relative sealing between the piston rod 9 and cylinder 11. Damper mounting locations are defined at the base bracket 10 and the threaded portion adjacent the end of the piston rod 8. An internal accumulator set screw 7 passes from the end 53 of the piston rod 9 through a set screw axial passage 52 in the piston rod 9 and is attached at the set screw's opposite end 53 to the internal accumulator assembly 15. Internal electromagnet electrical supply wires 6 also pass through a wire passage 51 axially penetrating a section of the piston rod 9 and connect to the internal piston electromagnet 13.

Figure 5:
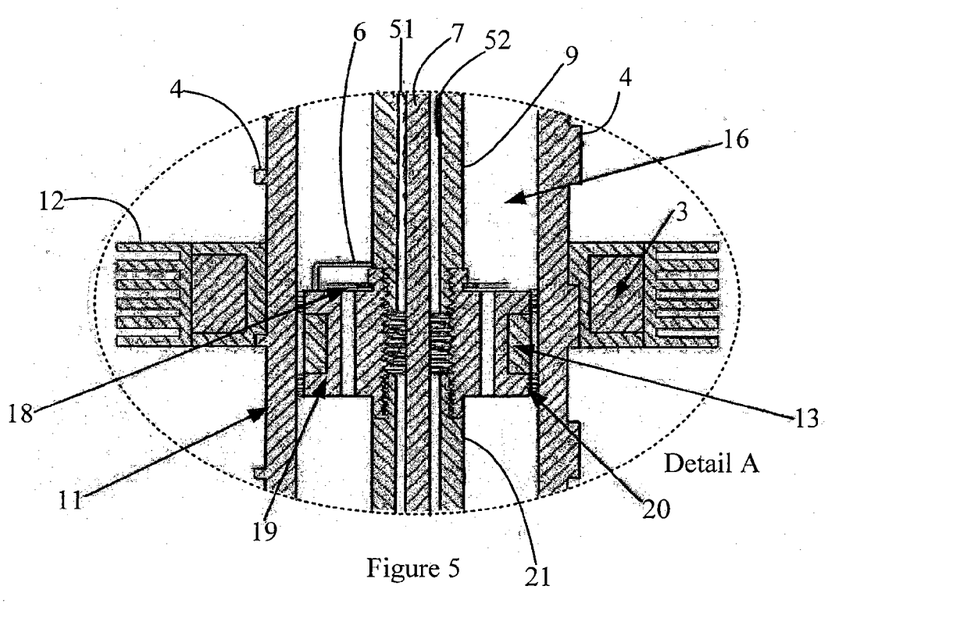
FIG. 5 is a partial cross-sectional view of the MRF damper piston region, section A of FIG. 4.

With reference to FIG. 5, the external electromagnet 3 also is encased in a finned assembly 12 to accelerate convective cooling, and the MRF piston 19 achieves control of the apparent or effective viscosity of the MR fluid contained in the damper chamber 16 by activation of both or either of the internal electromagnet 13 and the external electromagnet 3. In this manner, the electromagnetic flux generated by these electromagnets 13, 3 penetrates an MR valving region 20. This increases MRF damping depending on the level of flux generated by the electromagnets 13, 3 as MRF passes between a first sub- or secondary chamber 54 and a second sub- or secondary chamber 55 in the primary chamber 16. In this regard, this MRF damping can also occur by activating either electromagnet independently.

A by-pass orifice and shim stack washer system 18 also can be sized to meet any desired performance limit. These types of valving and washers, either by themselves or along with adjustment of damping characteristics of MRF, can provide non-symmetric compression and rebound forces among others.

Non-symmetric forces can be desirable in many applications, such as for vehicle suspensions. Following a large energy dissipation stroke, for example, the damper can thereby rebound with minimal or at least reduced force, helping to insure that wheel contact with the road is not lost. These types of structures may of course be utilized in any of the dampers disclosed in this specification.

The internal accumulator set screw 7 passes through a mating set screw axial passage 52 in the piston rod 9 to extend through the bottom or lower rod end 21. The end of the set screw 7 so extending through the lower rod end 21 is, in turn, attached to the internal accumulator assembly (not shown in FIG. 5).

Internal electromagnet electrical supply wires 6 also pass through mating supply wire passages, e.g., 51, penetrating an axial length of the piston rod 9. The supply wires 6 thereby connect to the internal piston electromagnet 13.

Figure 6:
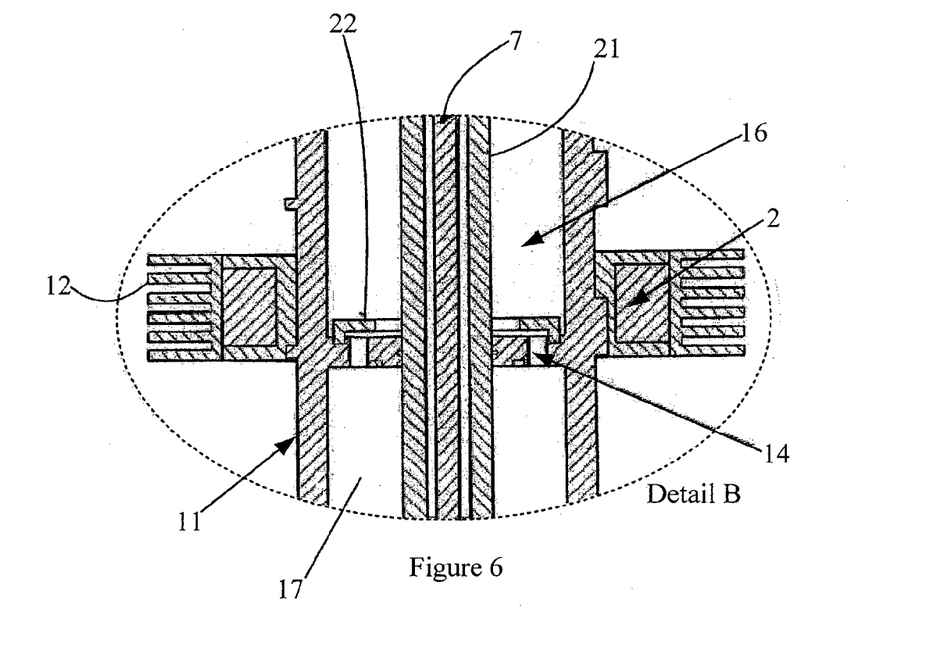
FIG. 6 is a partial cross-sectional view of the damper and liquid spring chamber flow regulation orifice, shown in section B of FIG. 4.

With reference to FIG. 6, the flow of MRF through regulating orifice 14 is affected or controlled by the external electromagnet 2. This is accomplished by altering MRF apparent viscosity with flow regulation ring 22. The flow regulation orifice 14 and the associated viscosity flow regulation ring 22 thereby cooperatively restrict MRF flow between the damper chamber 16 and the liquid spring chamber 17.

Alternatively, flow regulation orifice 14 can be physically blocked or eliminated to prevent flow between the damper chamber 16 and the liquid spring chamber 17. In this configuration, MRF can be used in the damper chamber 16 and separate compressible MRF or other compressible gas or compressible fluid, such as compressible silicone fluid or fluid containing compressible elastomers, can be used in the liquid spring chamber 17.

As noted above, the internal accumulator set screw 7 passes through the lower rod end 21. The set screw 7 is attached to the internal accumulator assembly (not shown in FIG. 6).

Figure 7:
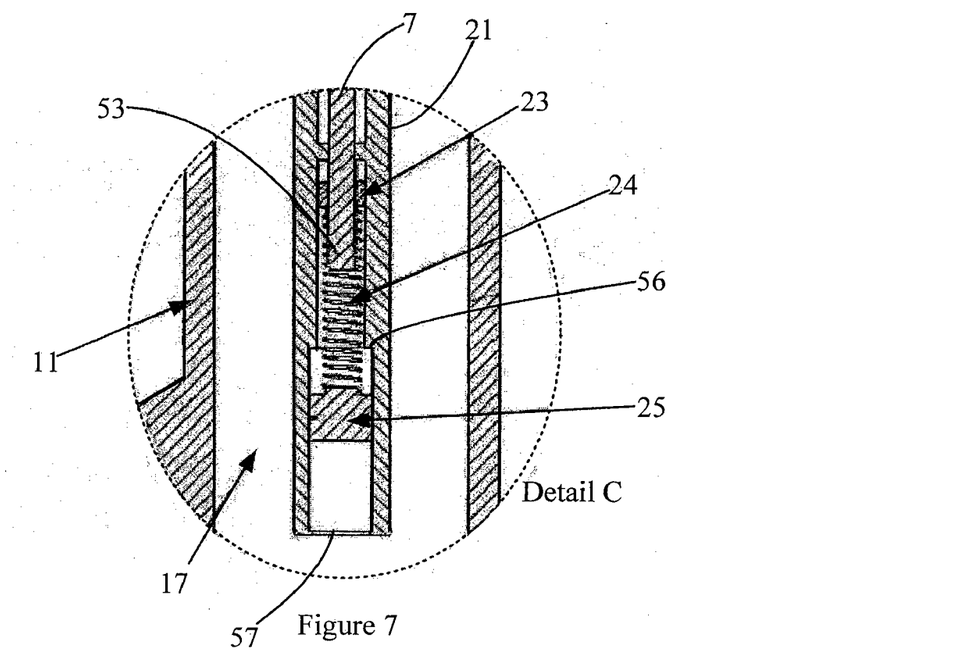
FIG. 7 is a partial cross-sectional view of the liquid spring chamber's internal accumulator, shown in section C of FIG. 4.

With reference to FIG. 7, the internal accumulator set screw 7 passes through the lower rod end 21 and is attached to the accumulator spring compression nut 23, which adjusts and thereby controls the preset force of the accumulator spring 24. The floating accumulator piston 25 is otherwise relatively freely moveable between upper and lower stops 56, 57 adjacent the lower rod end 21. The lower rod end 53 may thus displace, or increase (or decrease) mechanical spring force biasing fluid in the liquid spring chamber 17, providing an adjustable energy storage medium in the preferred compressible MRF damper/strut device 1.

Figure 8:
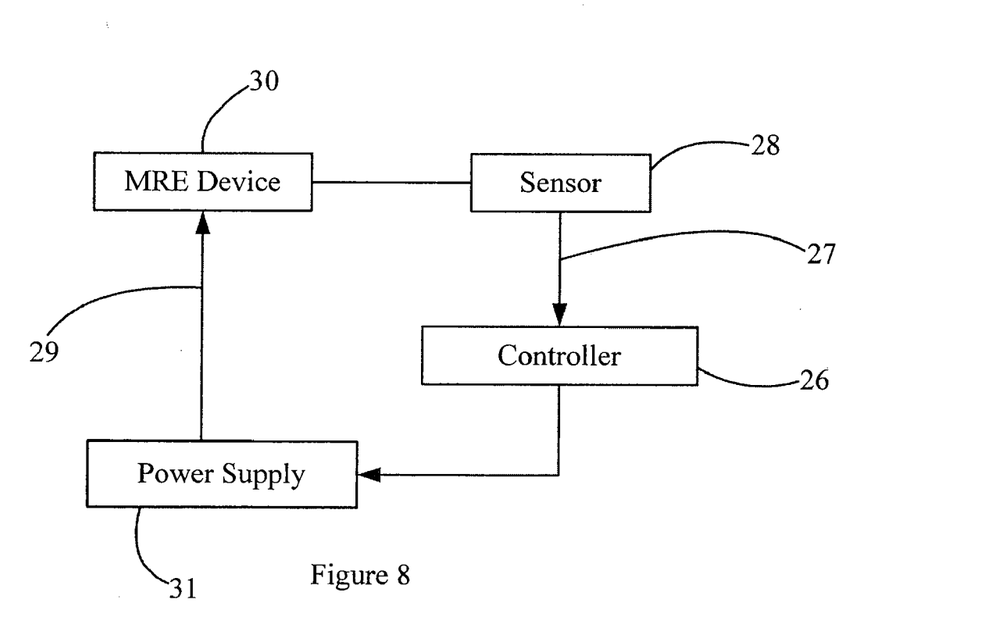
FIG. 8 is a control system block diagram for the controllable compressible MRF damper embodiments shown in FIGS. 1-7 above.

FIG. 8 presents a mechanical system block diagram that incorporates a controller 26 that utilizes a feedback signal 27 from a sensor(s) 28 to determine appropriate current 29 to the MRF device 30 from a power supply 31.

In the embodiments of FIGS. 1-7, the magnets are electromagnets. Other types of magnets may be substituted for one or more such electromagnets depending on the damping, energy storage, and adjustability characteristics desired for the resulting damper/strut.

It should also be noted that the embodiments of FIGS. 1-7 may be altered to include one or more yet additional pistons to provide yet additional variability or control of the damping and energy storage response and capacity of the damper/strut.

In the embodiments of FIG. 1-7, MRF is utilized to provide viscosity alteration of a material within the damper or strut. However, other MR material may be utilized in a given environment provided that, when utilized, the resulting damper or strut provides the desired controllable and adjustable viscous material flow and storage characteristics. In addition, rather than using MRF and magnets, other material subject to alteration of viscosity by alteration of its associated physical environments may also be used in conjunction with one or more alternative mechanisms required to accomplish such viscosity or material flow alteration.

Controllable compressible dampers such as those specified above can be used for vibration isolation, energy dissipation, and energy storage for both mechanical systems in mitigating shock events and civil infrastructure in mitigating seismic and natural hazards as well as in protecting infrastructure from man-made hazards. These dampers also can potentially be utilized in automotive suspension systems, vibration isolation and energy storage in mechanical systems, sensitive equipment mounts, and manufacturing automation systems that may require vibration isolation to improve their production performance. Mechanical and structural systems that are subjected to random disturbances also can benefit from controllable vibration isolators and energy dissipaters such as those specified above. The above-specified controllable compressible damper/strut also can be used in conjunction with a feedback control system in order to provide desired damping response to a given disturbance.

It is to be understood that the foregoing is a detailed description of preferred and other embodiments. The scope of the present invention is not to be limited thereby and is to be measured by the claims, which shall embrace appropriate equivalents.

What we claim is:

1. A magnetorheological fluid damper apparatus comprising in combination:
   a damper housing providing at least a primary chamber and a secondary chamber, the primary chamber containing a magnetorheological fluid and the secondary chamber containing and sealingly enclosing a resiliently compressible material, wherein said magnetorheological fluid in the primary chamber is substantially separated from said resiliently compressible material in the secondary chamber;
   a piston rod passing through the primary chamber and penetrating the secondary chamber, the piston rod having at least one piston mounted thereon within the primary chamber, wherein the at least one piston includes at least one magnetorheological fluid passageway through which said magnetorheological fluid is allowed to flow; and
   a plurality of adjustably activatable magnets disposed along the axial length of the primary chamber; whereby at least said magnetorheological fluid in the primary chamber may be activated by the adjacent adjustably activatable magnets along the axial length of the primary chamber; and
   wherein: (i) the primary chamber includes at least a first sub-chamber and a second sub-chamber, and (ii) the at least one piston (a) is disposed intermediate the first sub-chamber and the second sub-chamber and (b) provides a magnetorheological fluid passage for the magnetorheological fluid to flow between the first sub-chamber and second sub-chamber.

2. The magnetorheological fluid damper apparatus of claim 1, wherein the damper apparatus further includes at least one piston magnet mounted adjacent the magnetorheological fluid passage, whereby magnetorheological fluid in the magnetorheological fluid passage may be activated by the at least one piston magnet.

3. The magnetorheological fluid damper apparatus of claim 2 wherein the at least one piston magnet comprises an electromagnet.

4. The magnetorheological fluid damper apparatus of claim 1 wherein the piston rod includes an adjustable spring adjustably biasing the compressible material in compression.

5. The magnetorheological fluid damper apparatus of claim 1 wherein the primary chamber is incompressible.

6. The magnetorheological fluid damper apparatus of claim 1 wherein the primary chamber is compressible.

7. The magnetorheological fluid damper apparatus of claim 2, wherein the piston rod includes an adjustable spring adjustably biasing the compressible material in compression.

8. The magnetorheological fluid damper apparatus of claim 2, wherein the primary chamber is incompressible.

9. The magnetorheological fluid damper apparatus of claim 2, wherein the primary chamber is compressible.

* * * * *